United States Patent [19]

Indou

[11] Patent Number: 5,253,833
[45] Date of Patent: Oct. 19, 1993

[54] TRIPOD LOCK DEVICE

[75] Inventor: Kenji Indou, Hadano, Japan

[73] Assignee: Sokkia Co., Ltd., Kanagawa, Japan

[21] Appl. No.: 951,881

[22] Filed: Sep. 28, 1992

[30] Foreign Application Priority Data

Sep. 30, 1991 [JP] Japan .................................. 3-278314

[51] Int. Cl.$^5$ .............................................. F16M 11/38
[52] U.S. Cl. .................... 248/168; 248/188.5
[58] Field of Search .................. 248/168, 163.1, 163.2, 248/439, 440, 173, 188.5, 188.2, 165, 411; 403/104; 354/81; 352/243

[56] References Cited

U.S. PATENT DOCUMENTS

| 3,051,425 | 8/1962 | Homrighausen | 248/168 |
| 4,378,100 | 3/1983 | Minozzi et al. | 248/168 |
| 4,767,090 | 8/1988 | Hartman et al. | 248/168 |
| 4,832,296 | 5/1989 | Schnepp | 248/168 |
| 4,932,622 | 6/1990 | Hayakawa | 248/411 X |

FOREIGN PATENT DOCUMENTS

| 51-15359 | 2/1976 | Japan . |
| 51-95344 | 7/1976 | Japan . |
| 51-115954 | 9/1976 | Japan . |
| 60-174814 | 11/1985 | Japan . |
| 63-181909 | 11/1988 | Japan . |

Primary Examiner—Ramon O. Ramirez
Attorney, Agent, or Firm—Hill, Steadman & Simpson

[57] ABSTRACT

A tripod lock device for locking a tripod having three identical legs each composed of a fixed leg and a movable leg slidably disposed between a pair of parallel spaced leg members of the fixed leg for adjusting the length of the leg in a telescopic manner. The tripod lock device is composed of three identical leg lock units each associated with one of the three legs of the tripod. Each of the leg lock units includes a frame, an eccentric cam and an engagement portion. The frame has a through-hole in which the leg members of the fixed leg and the movable leg are disposed, with one of the leg members secured to the frame. The engagement portion comprises a rod disposed on the frame at a position adjacent to said one leg member. The eccentric cam includes a presser portion and a hook. When the eccentric cam is rotated in one direction, the presser portion forces the one leg member toward the other leg member to firmly grip the movable leg between the two leg members of the fixed leg, and the hook of one of the leg lock units hooks on the rod of an adjacent one of the leg lock unit. Thus, the three legs of the tripod are locked together against spreading.

24 Claims, 10 Drawing Sheets

5,253,833

TRIPOD LOCK DEVICE

BACKGROUND OF THE INVENTION

1. Field of the Invention:

The present invention relates generally to a device for locking a tripod having three identical legs each composed of a fixed leg and a movable leg coupled together in a telescopic manner, and more particularly to such a tripod lock device which is capable of locking each leg of the tripod by one motion and is particularly suitable for use with a tripod for surveying instruments.

2. Description of the Prior Art:

Conventionally, a tripod used with a surveying instrument includes a head and three legs hinged at one end to the head. Each of the legs includes a fixed leg composed of two parallel spaced fixed leg members, and a movable leg slidably disposed between the fixed leg members for achieving a telescopic motion. The movable leg can be locked in position against displacement relative to the fixed leg by means of a lock member such as a screw fastener associated with one leg member of the fixed leg.

When the three legs of the tripod are to be bound together, a fastening strip or band is used in addition to the lock member. The band has a buckle at one end and a punch hole at an opposite end. The punch hole is engageable with a prong of the buckle. In use, the band is fastened around the legs of the tripod and then the prong of the buckle is engaged into the punch hole, thereby binding the legs together against spreading.

The screw fastener used as the lock member between the fixed leg and the movable leg may include a screw having a diameter 4 mm and a pitch of 0.7 mm, and a screw having a diameter of 8 mm and a pitch of 1.25 mm. In order to provide an effective fastening strength, the screw must be advanced by a distance at least equal to one pitch of the screw. This means that the screw must be rotated in a tightening direction at least by one turn. The tightening operation of the screw fastener is tedious and time-consuming. In addition, the lock member composed of a screw fastener having threads is likely to catch a foreign matter such as dirt which will stain the screw fastener and thereby lower the durability of the screw fastener. Due to the dirt deposited between the adjacent threads, the screw fastener cannot rotate smoothly and only gives an insufficient tightening strength.

The conventional lock member is able to provide a firm lock between the fixed leg and the movable leg of each of the three legs, however, in order to lock the three legs together, a separate fastener member such as a fastening band must be provided. This means that in the case of the conventional tripod, fastening between the fixed leg and the movable leg of each of the three legs and fastening between the three legs are accomplished separately. In the case where a fastening band is used, each time when hand-carrying of a tripod from one survey point to another or transportation of the tripod for a long distance is necessary, the fixed leg and the movable leg of each leg are fastened together by one lock member and, subsequently, the three legs are bundled together by the fastening band. In this instance, one end of the fastening band is threaded through the buckle and, subsequently, the prong of the buckle is fitted into the punch hole in the fastening band. The legbinding operation using the fastening band makes the hand-carrying of transportation of the tripod tedious and inconvenient.

SUMMARY OF THE INVENTION

It is, therefore, a general object of the present invention to overcome the foregoing problems associated with the prior art.

A more specific object of the present invention is to provide a tripod lock device capable of locking a fixed leg and a movable leg of each leg of a tripod without using a screw fastener which would otherwise cause a tightening failure due to a stain or rust on the screw fastener, deposition of a foreign matter such as dirt between the thread, or accidental bending of the screw fastener during the use of the tripod.

Another object of the present invention is to provide a tripodlock device which is capable of locking and releasing a fixed leg and a movable leg of each leg of a tripod by one motion, and also able to bind the three legs of the tripod at the same time the fixed and movable legs of the respective legs are locked together.

To attain the foregoing objects, there is provided, according to the present invention, a tripod lock device for locking a tripod having a head and three identical legs each connected by one hinge to the head, each of the three legs being composed of a fixed leg and a movable leg slidably movable relative to the fixed leg, one of the fixed leg and the movable leg including a pair of parallel spaced leg members, the other of the fixed leg and the movable leg being slidably disposed between the leg members for expanding and contracting each respective leg, the tripod lock device comprising: three identical leg lock units each associated with one of the three legs of the tripod for locking the movable leg and the fixed leg against relative movement, the leg lock units being engageable with each other to lock the three legs of the tripod against spreading, each of the leg lock units including a frame, an eccentric cam and an engagement portion; the frame having a through-hole in which the leg members of one of the fixed leg and the movable leg and said other of the fixed leg and the movable leg are disposed, one of the leg members being secured to the frame; the eccentric cam being rotatably mounted on the frame at a position adjacent to said other of the leg members, the eccentric cam having a presser portion and a hook, when the eccentric cam is rotated in one direction, the presser portion of the eccentric cam forcing said other leg member toward said one leg member to firmly grip said other of the fixed leg and the movable leg between said one leg member and said other leg member; and the engagement portion being disposed on the frame at a position adjacent to said one leg member in a diagrammatically opposite relation to the eccentric cam about the through-hole, the engagement portion of each of the three leg lock units being interlockingly engageable with the hook of an adjacent one of the three leg lock units to lock the three legs of the tripod when the eccentric cam is rotated in said one direction with the three legs of the tripod disposed near together.

As described above, each of the leg lock units of the tripod lock device includes a frame, an eccentric cam and an engagement portion. The frame has a through-hole in which the leg members of one of the fixed leg and the movable leg and the other of the fixed leg and the movable leg are disposed, with one of the leg members secured to the frame. The eccentric cam is rotatably mounted on the frame at a position adjacent to said other of the leg members. The eccentric cam has a presser portion and a hook, and when the eccentric cam is rotated in one direction, the presser portion of the eccentric cam forces said other leg member toward said one leg member to firmly grip said other of the fixed leg and the movable leg between said one leg member and said other leg member. The engagement portion is disposed on the frame at a position adjacent to said one leg member in a diagrammatically opposite relation to the eccentric cam about the through-hole. When the eccentric cam is rotated in said one direction with the three legs of the tripod disposed near together, the engagement portion of each of the three leg lock units is interlockingly engaged by the hook of an adjacent one of the three leg lock units so as to lock the three legs of the tripod.

With this construction, it is possible to limit the range of rotation of the eccentric cam within an angle of 180 degrees. By properly adjusting the eccentricity of the eccentric cam, a great amount of displacement, such as more than 1 mm, can be provided between the fixed leg and the movable leg, so that these legs can be locked and released by a single motion of the eccentric cam. In addition, when the eccentric cam is turned with the legs of the tripod held in a closed condition, the hook on the eccentric cam of each of the leg lock units hooks on the engagement portion of an adjacent one of the leg lock units. Thus, the leg lock units are jointed together so that the legs of the tripod are locked in position against spreading.

It is apparent from the foregoing description, the tripod lock device of this invention is easy to manipulate and reliable in operation. Furthermore, since the fixed leg and the movable leg are locked together without using a screw fastener, it is possible to avoid the occurrence of various problems such as an insufficient tightening which would otherwise be caused by a rust or stain on the screw fastener, deposition of dirt between the threads of the screw fastener, or bending of the screw fastener due to an accident during the use of the tripod. In addition, the tripod lock device of this invention is able to lock the legs of the tripod in a closed condition simultaneously with the locking of the fixed and movable legs of the respective legs. With the use of the tripod locking device, transportation and storage of the tripod can be facilitated.

According to the present invention, each of the leg lock units mounted on one of the legs of the tripod may be movable longitudinally of the leg within a limited range defined by a stopper provided at an end of the fixed leg and a stopper provided at an end of the movable leg. The leg lock unit can be locked at any desired position within the limited range, in accordance with a relative position between the fixed leg and the movable leg.

The above and other objects, features and advantages of the present invention will become more apparent from the following description when making reference to the detailed description and the accompanying sheets of drawings in which preferred structural embodiments incorporating the principles of the present invention are shown by way of illustrative examples.

DETAILED DESCRIPTION OF THE PREFERRED EMBODIMENTS

FIGS. 1 through 4 show a tripod lock device according to one embodiment of the present invention.

Figure 1:
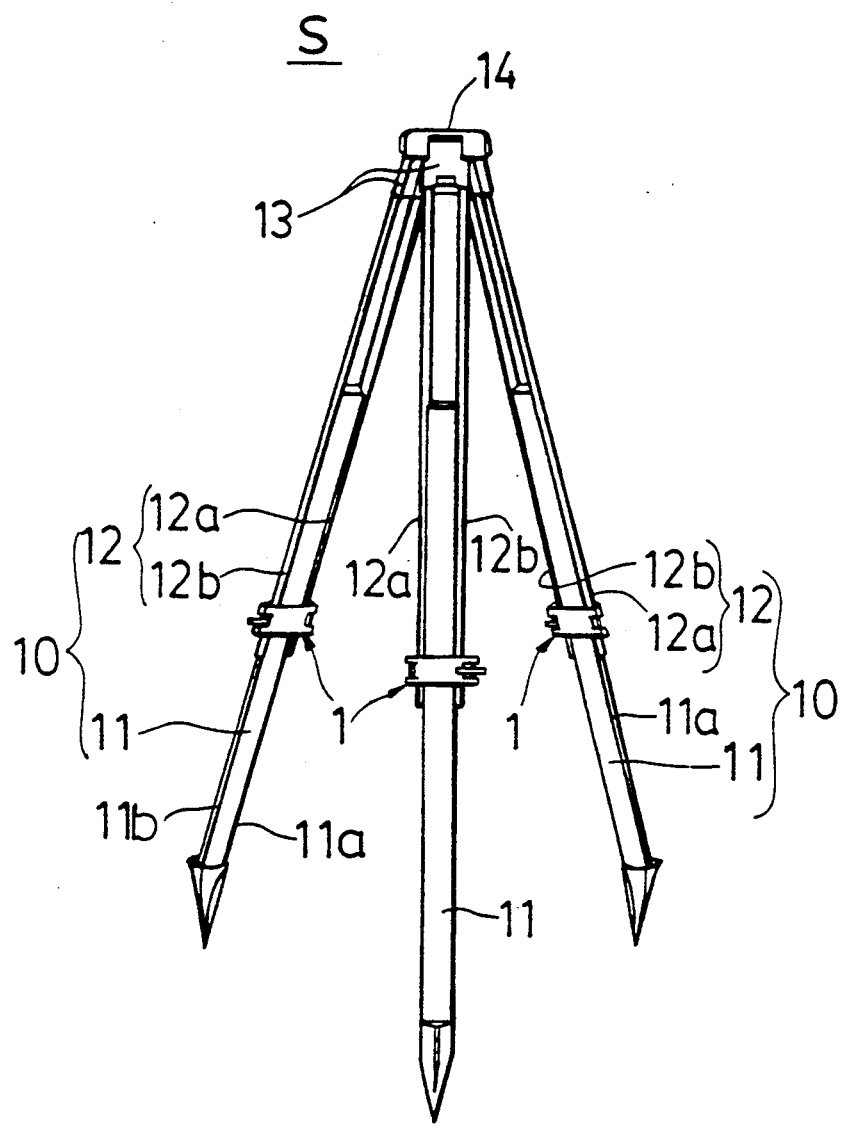
FIG. 1 is a schematic perspective view of a tripod and a tripod lock device associated therewith according to one embodiment of the present invention.

As shown in FIG. 1, a tripod S for use with a surveying instrument has three identical legs 10 each connected by one hinge 13 to a head 14 of the tripod S. Each of the legs 10 includes a movable leg 11 and a fixed leg 12. In the illustrated embodiment, the fixed leg 12 is composed of a pair of parallel spaced hollow cylindrical pipe members 12a and 12b pivotally connected at one end to the head 14 by means of a corresponding one of the hinges 13. The movable leg 11 is slidably disposed between the pipe members 12a and 12b of the fixed leg 12. The movable leg 11 has two sliding surfaces 11a and 11b on its opposite sides. The sliding surfaces 11a and 11b have an arcuate shape in cross section which is complementary in contour to the shape of the hollow cylindrical pipe members 12a and 12b of the fixed leg 12. Thus, the sliding surfaces 11a and 11b are slidably engageable with outer surfaces of the respective pipe members 12a and 12b. With this construction, the length of each leg 10 can be changed by sliding the movable leg 11 in a longitudinal direction relative to the fixed leg 12.

The tripod S of the foregoing construction includes a tripod lock device according to this invention. The tripod lock device is composed of three identical leg lock units 1 attached to lower ends of the respective fixed legs 12 of the tripod S. Each of the leg lock units 1 includes a frame 2, an eccentric cam 3 and an engagement portion 2c.

Figure 2:
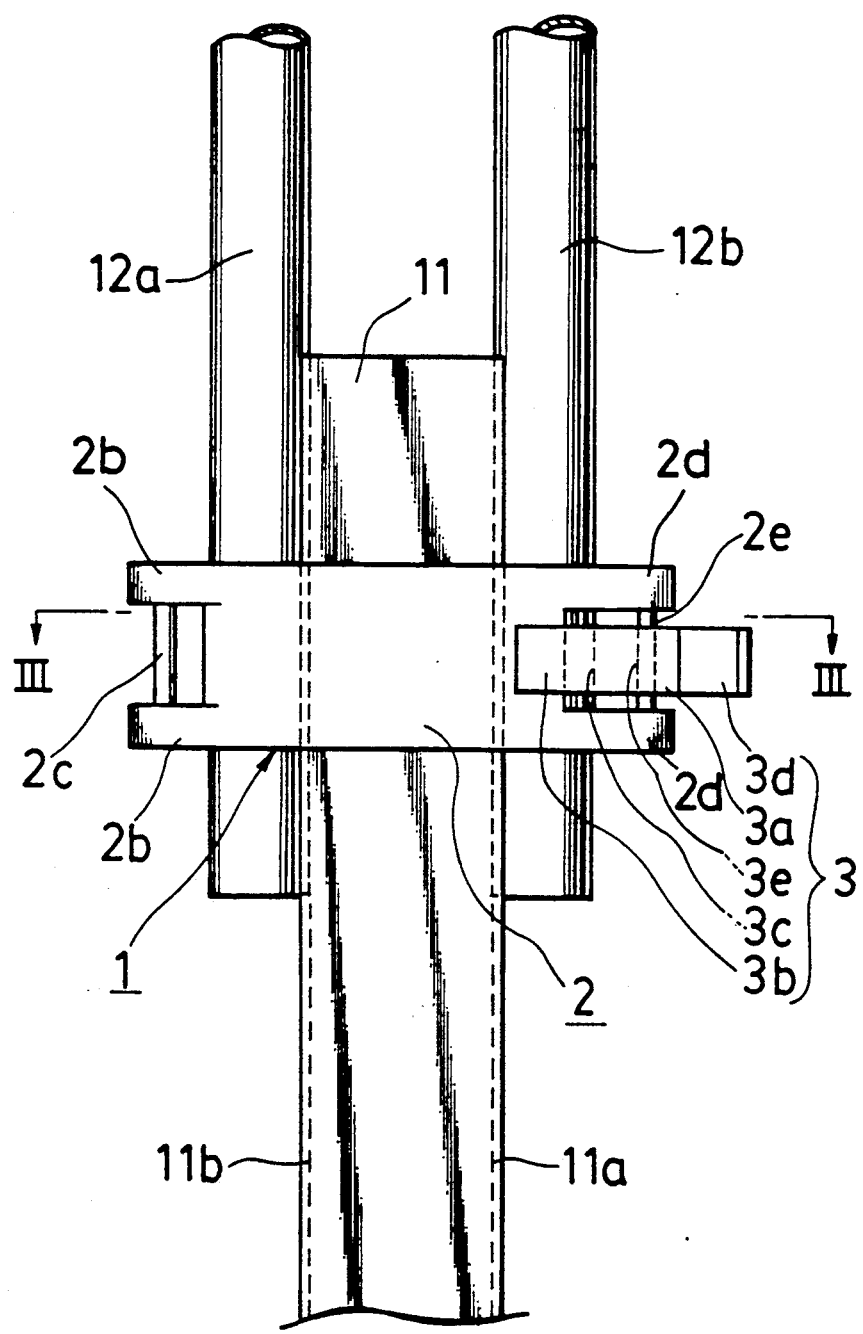
FIG. 2 is a front elevational view showing one of three identical leg lock units of the tripod lock device.
Figure 3:
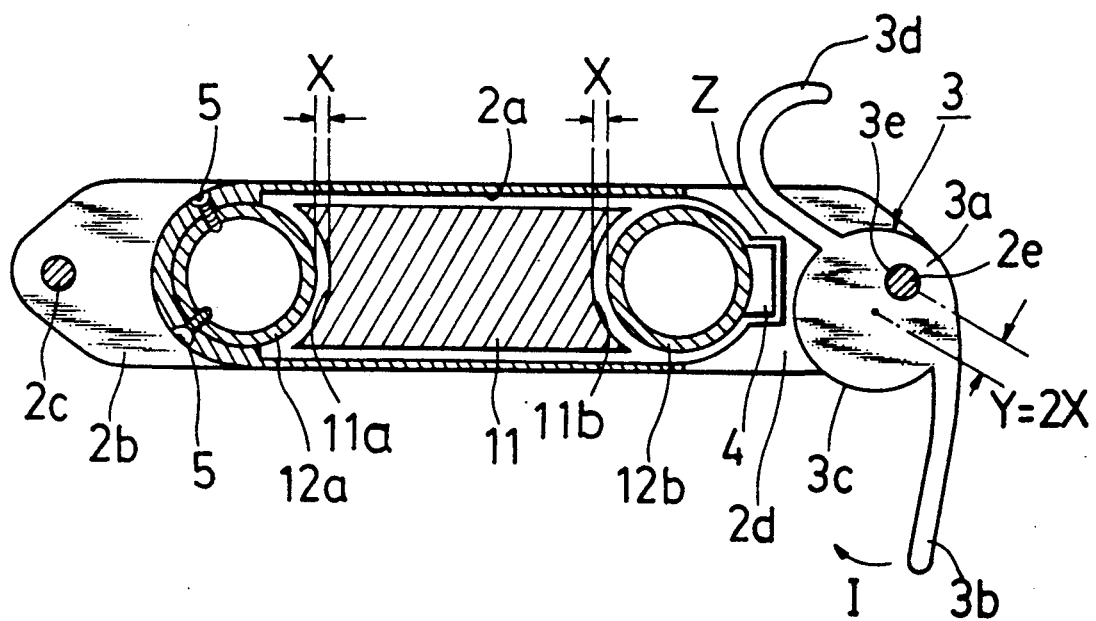
FIG. 3 is a cross-sectional view taken along line A—A of FIG. 2.

As shown in FIG. 3, the frame 2 has a generally oblong ring shape having a central through-hole 2a for receiving therein the pipe members 12a and 12b of the fixed leg 12 and the movable leg 11 in such a manner that the movable leg 11 is slidably movable relative to the pipe members 12a and 12b of the fixed leg 12. The pipe member 12a is secured to the frame 2 by means of a known fastener such as a plurality of screws 5. The pipe member 12b is not secured to the frame 2 but freely received in the through-hole 2a. The pipe member 12b retains on its outside surface a locking piece 4 which is engageable with the eccentric cam 3 for locking the fixed leg 12 and the movable leg 11 against relative movement. Within the through-hole 2a, the movable leg 11 is spaced by a distance X from each of the pipe members 12a and 12b so as to ensure sliding movement between the movable leg 11 and the fixed leg 12. The locking piece 4 received in the through-hole 2a with a space Z between itself and the frame 2 is spaced from the eccentric cam 3 by a distance which is smaller than the eccentricity Y of the eccentric cam 3, the eccentricity Y of the eccentric cam 3 being set to equal to 2X. The frame 2 includes a pair of parallel spaced first wings 2b (left wings in FIGS. 2 and 3) projecting outwardly from a portion of the frame 2 adjacent to the pipe member 12a, and a pair of parallel spaced second wings 2d (right wings in FIGS. 2 and 3) projecting outwardly from a portion of the frame adjacent to the pipe member 12b. The first wings 2b and the second wings 2d extend perpendicularly to the direction of movement of the movable leg 11 relative to the fixed leg 12.

The engagement portion 2c comprises a rod extending between the first wings 2b. The rod 2c is spaced from the body of the frame 2 for a purpose described below.

The eccentric cam 3 is disposed in a space defined between the second wings 2d. The eccentric cam 3 is rotatably mounted on a support pin 2e extending between the second wings 2d. The support pin 2e is disposed in such a position relative to the locking piece 4 that when the eccentric cam 3 is actuated to assume an operating position, the locking piece 4 is forced by the eccentric cam 3 in a direction to lock the movable leg 11 and the fixed leg 12, with the movable leg 11 firmly gripped between the pipe members 12a and 12b of the fixed leg 12. In the illustrated embodiment, the eccentric cam 3 is made of metal, however, an eccentric cam made from a synthetic resin, such as a rigid plastic or a semi-rigid plastic, may be used for reducing a friction between the eccentric cam 3 and the locking piece 4, thereby reducing wear.

As shown in FIGS. 2 and 3, the eccentric cam 3 includes a flat circular plate-like cam body 3a having a predetermined thickness, a lever 3b extending tangentially from an outer peripheral portion of the cam body 3a, and a hook 3d extending radially outwardly from an outer peripheral portion of the cam body 3a which is diametrically opposite to the outer peripheral portion from which the lever 3b projects. The cam body 3a has a hole 3e slidably fitted over the support pin 2e, and a presser portion 3c extending arcuately between the lever 3b and the hook 3d. The hole 3e is eccentric to, or off-center from, the center of the cam body 3a in a direction opposite to the presser portion 3c. The hook 3d is bent or curved in a direction same as the direction I of rotation of the eccentric cam 3 when the eccentric cam 3 is actuated to lock the movable leg 11 and the fixed leg 12 composed of the pipe members 12a and 12b. More specifically, when the lever 3b is actuated to turn the cam body 3a about the support pin 2e in the direction of the arrow I (FIG. 3), the presser portion 3c engages the locking piece 4 and then forces the pipe member 12b toward the pipe member 12a so as to frictionally lock or grip the movable leg 11 by and between pipe members 12a and 12b of the fixed leg 12. When the movable leg 11 and the fixed leg 12 of each leg 10 are locked together by an associated one of the leg lock units 1, the hook 3d of the eccentric cam 3 of the same leg lock unit 1 hooks on the engagement portion 2c of an adjacent one of the leg lock units 1.

In the illustrated embodiment, the pipe member 12b constituting one part of the fixed leg 12 is provided with the locking piece 4 facing to the eccentric cam 3 for engagement therewith. With the use of the locking piece 4, it is possible to enjoy a large working and assembling tolerance set for the movable leg 11, fixed leg 12 and leg lock device 1.

The locking piece 4 is preferably made of an elastic material such as rubber, or a resilient material such as a plate spring. The elastic locking piece 4 is advantageous because, when the pipe member 12b of the fixed leg 12 is forced by the eccentric cam 3 toward the movable leg 11 and the pipe member 12a, the elastic locking piece 4 elastically deforms to accommodate the working and assembling tolerance of the movable leg 11, fixed leg 12 and the associated leg lock unit 1. In addition, owing to a spring force exerted from the elastic locking piece 4 on the eccentric cam 3, it is possible to maintain an effective angle of rotation of the eccentric cam 3 constantly. In the embodiment described above, the leg members 12a and 12b constituting the fixed leg 12 are formed from a pipe made of metal such as aluminum, in order to reduce the overall weight of the tripod S. However, the leg members 12a and 12b may be made of a round bar or a square bar of metal or wood. Since the arcuate sliding surfaces 11a and 11b of the movable leg 11 which are complementary in contour to the shape of the pipe members 12a and 12b of the fixed leg 12 are relatively large, it is possible to lock the movable leg 11 firmly and stably against the fixed leg 12.

The tripod lock device of the foregoing construction operates as follows.

When the tripod S is to be set at a survey point, the movable leg 11 is pulled out from, or contracted into, the fixed leg 12 until a desired length is reached for each leg 10. Then the movable leg 11 and the fixed leg 12 are locked together by each of the leg lock units 1 associated with the respective legs 10 of the tripod S.

In this instance, the lever 3b provided on the eccentric cam 3 of the leg lock unit 1 is turned in the direction of the arrow I shown in FIG. 3, thus causing the cam body 3a to turn clockwise about the support pin 2e. With this angular movement of the cam body 3a, the peak of the arcuate presser portion 3c of the cam body 3a gradually approaches the through-hole 2a of the leg lock unit 1. As the movement of the cam body 3a continues, the arcuate presser portion 3c is brought into contact with the locking piece 4 and then forces the locking piece 4 and the pipe member 12b toward the movable leg 11 and the pipe member 12a. When a peak of the arcuate presser portion 3c arrives at the locking piece 4, the movable leg 11 is firmly gripped by and between the pipe members 12a and 12b of the fixed leg 12 (see FIG. 4). The foregoing leg-locking operation is achieved for all the legs 10 of the tripod S and, subsequently, the legs 10 are spread to set the tripod S stably at the survey point. When the movable leg 11 is to be released from the fixed leg 12, the lever 3b is turned in a direction opposite to the direction of the arrow I (FIG. 3).

When the tripod S is to be locked for a purpose of transportation, for example, the legs 10 are fully retracted by forcing the movable legs 11 into the corresponding fixed legs 12. The fully retracted legs 10 are closed and, thereafter, the eccentric cam 3 of each leg lock unit 1 associated with one of the legs 10 is turned to lock the movable leg 11 relative to the fixed leg 12 in the same manner as described above. Upon rotation of the eccentric cam 3, the hook 3d of each of the leg lock units 1 hooks on the engagement portion 2c of an adjacent one of the leg lock units 1.

Figure 4:
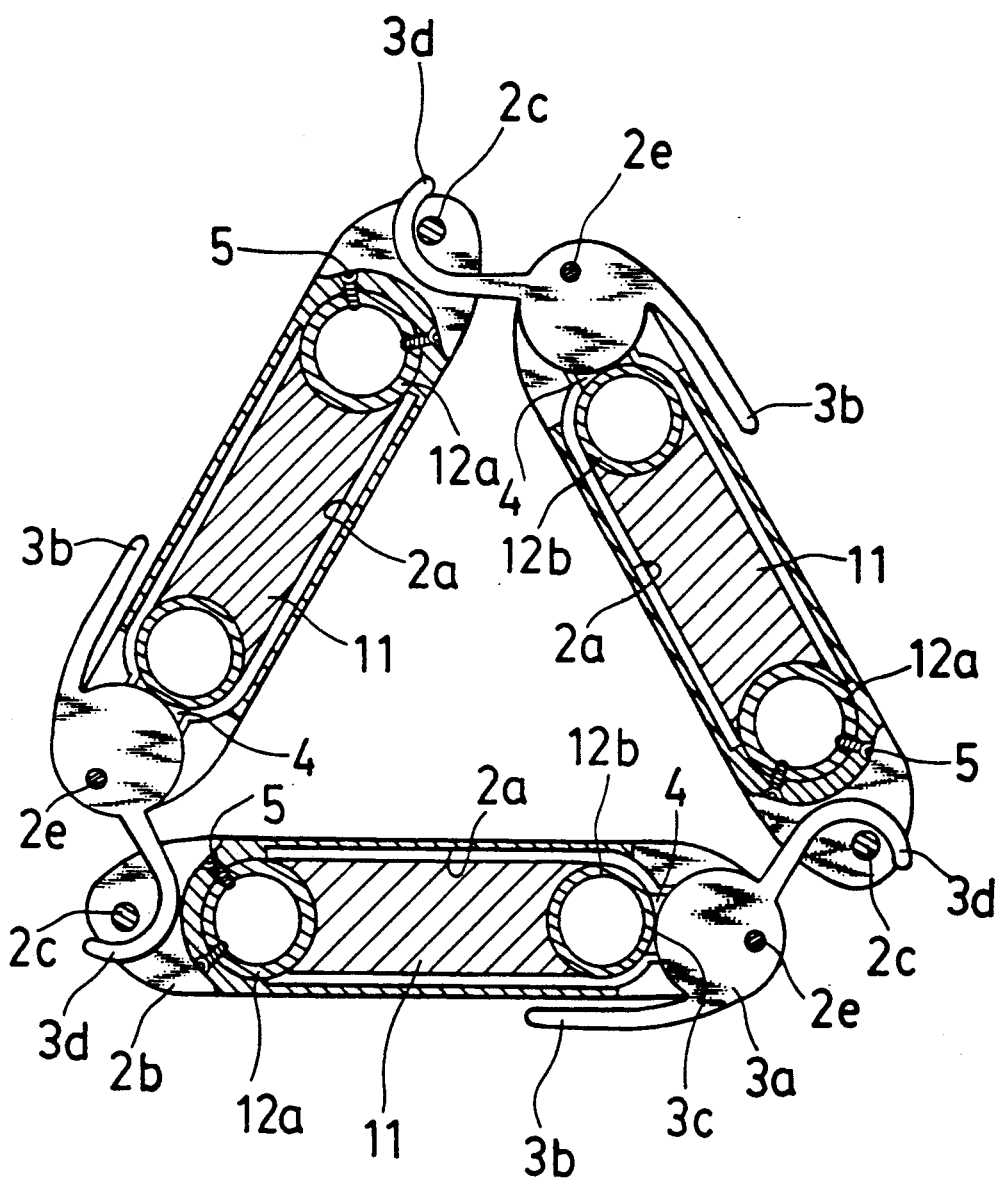
FIG. 4 is a cross-sectional view showing the operation of the tripod lock device.

Stated more specifically, while the retracted legs 10 of the tripod S are kept in a closed condition, the eccentric cam 3 of each of the leg lock units 1 is turned in such a direction as to lock the movable leg 11 relative to the fixed leg 12 of the associated leg 10. With this rotation of the eccentric cam 3, the hook 3d of one leg lock unit 1 hooks on the engagement portion 2c of the adjacent leg lock unit 1, as shown in FIG. 4. The leg lock units 1 of the tripod lock device are thus joined together, so that the legs 10 of the tripod S are locked against spreading and extension by means of the tripod lock device.

While the tripod locking device is in use (that is, during the use of the tripod S or during the storage of the tripod S), the lever 3b of each leg lock unit 1 does not project from the frame 2 but lies in close juxtaposition to a side wall of the frame 2 of the same leg lock unit 1. The levers 3b thus positioned facilitate handling, transportation and storage of the tripod S.

According to the embodiment described above, the engagement portion 2c of each leg lock unit 1 comprises a rod which is engageable with the hook 3d of an adjacent one of the leg lock units 1. The shape and construction of the engagement portion 2c and the hook 3d are construed as illustrative but not restrictive. The hook 3d may have a small projection which is engageable in a clicking or snapping manner with the engagement portion 2c.

Figure 5:
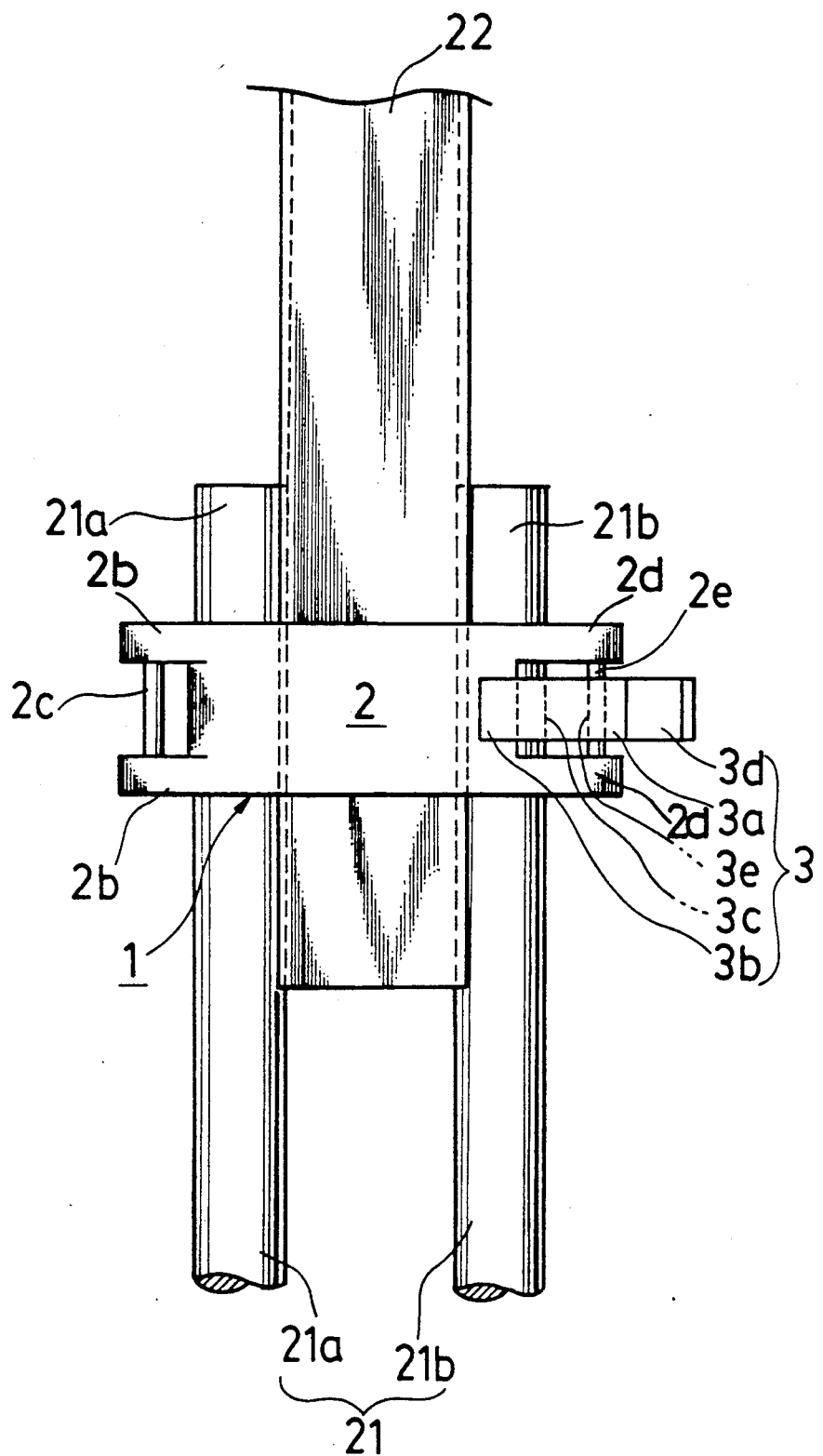
FIG. 5 is a view similar to FIG. 2, but showing another embodiment of the present invention.

FIG. 5 shows another embodiment of the present invention. These parts which are identical to those of the foregoing embodiment are designated by the same reference characters and a further description thereof can be omitted. In the first embodiment described above, each leg 10 of the tripod S is composed of a fixed leg 12 consisting of a pair of pipe members 12a and 12b, and a movable leg 11 slidably disposed between the pipe members 12a and 12b. According to the embodiment shown in FIG. 5, the movable leg 21 is composed of a pair of parallel spaced round bars 21a and 21b between which a fixed leg 22 is slidably disposed. Each of the leg lock units 1 is mounted on an upper end of the movable leg 21 of one of the legs 10 of the tripod S. The leg lock unit 1 is secured to one of the round bars 21a of the movable leg 21. The leg lock device 1 used in this embodiment has the same construction as the leg lock device 1 of the first embodiment described above.

The tripod lock device of the embodiment shown in FIG. 5 operates in the same manner as the tripod lock device of the first embodiment. According to this embodiment, since the leg lock unit 1 is disposed at an upper end of the movable leg 21, all the fixed legs 22 and the head 14 are slidable at one time relative to the movable legs 21 when the tripod S is set at a survey position or when the tripod S is contracted for transportation. During that time, the leg lock units 1 are held substantially at the same level and, hence, can be manipulated at the same level. Thus, leg-locking operation of the tripod S can be performed with utmost ease.

Figure 6:
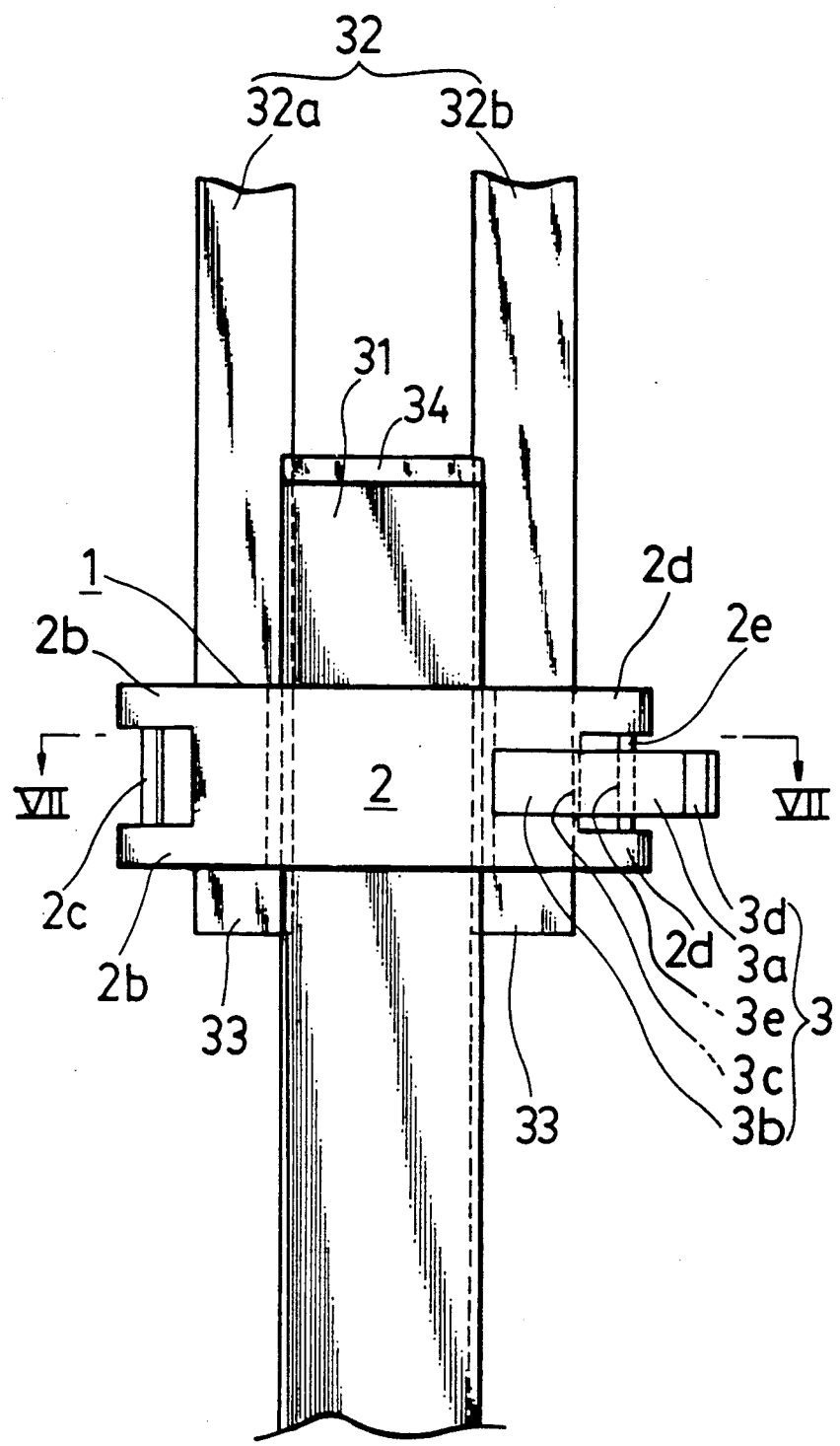
FIG. 6 is a front elevational view showing one of three identical leg lock units of a tripod lock device according to still another embodiment of the present invention.
Figure 7:
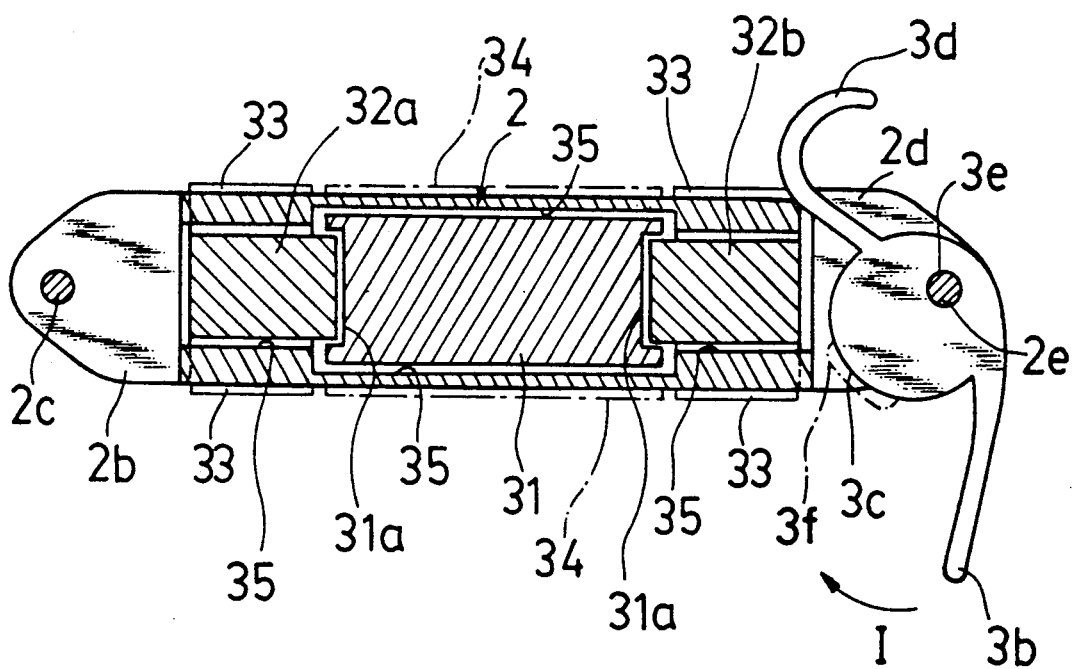
FIG. 7 is a cross-sectional view taken along line B—B of FIG. 6.

FIGS. 6 and 7 show one of three identical leg lock units 1 of a tripod lock device according to another embodiment of the present invention. These parts which are identical to those of the first embodiment described above with reference to FIGS. 1-4 are designated by the same reference characters, and a further description thereof will be omitted.

A tripod for surveying instruments which is used with the tripod lock device of this embodiment includes three legs 10 each including a fixed leg 32 composed of pair of parallel spaced bars 32a and 32b of a rectangular cross section, and a movable leg 31 of a rectangular cross section slidably disposed between the bars 32a and 32b of the fixed leg 32. An upper end portion of the movable leg 31 and upper end portions of the respective bars 32a and 32b of the fixed leg 32 are slidably received in a through-hole 2a formed in a frame 2 of the leg lock unit 1. In order to prevent the movable leg 31 from detaching from the leg lock unit 1, the movable leg 31 has at its upper end an anti-detachment stopper in the form of a flange 34 which is wider than the frame 2 of the leg lock unit 1. Similarly, in order to prevent detachment between the fixed leg 32 and the leg lock unit 1, each of the bars 32a and 32b has at its lower end an anti-detachment stopper comprising a flange 33 which is wider than the flange 2 of the leg lock unit 1. The stoppers (flanges) 33 and the stopper (flange) 34 may be formed of a separate member which is secured by screws or the like known fasteners to the bars 32a and 32b or the movable leg 31. The movable leg 31 has in its opposite side surfaces a pair of guide grooves 31a in which the bars 32a and 32b are partly received for sliding movement relative to the movable leg 31. Each of the guide grooves 31a has a guide surface (sliding surface) complementary in contour to the shape of a guide surface of one of the bars 32a and 32b of each leg 10. With this construction, it is possible to change the length of each of the legs of the tripod S.

The leg lock unit 1 includes an eccentric cam 3 made from a semi-rigid plastic. The through-hole 2 formed in the frame 2 of the leg lock unit 1 is partly defined by two confronting guide surfaces 35 slidably engageable with the movable leg 31 and the fixed leg 32 for guiding them stably through the through-hole 2. The leg lock unit 1 is slidably fitted over the fixed leg 32 and the movable leg 31 and movable relative to the fixed and movable legs 32 and 31 within a limited distance defined by and between the stoppers (flanges) 33 of the respective bars 32a and 32b of the fixed leg 32 and the stopper (flange) 34 of the movable leg 31.

The tripod lock device of the embodiment just described above operates as follows.

When the tripod S is to be set at a survey point, the fixed leg 32 and the movable leg 31 of each leg 10 are slid relative to one another until the leg 10 expands to a desired length. Then, each of the leg lock units 1 is actuated to lock a corresponding one of the legs 10. In this instance, since the leg lock unit 1 is not secured to either leg 32 or 31, it is retained on the stoppers (flanges) 33 formed at the lower end of the fixed leg 32. To lock the movable leg 32 and the fixed leg 32 together, the lever 3b of the leg lock unit 1 is turned in the direction of the arrow I shown in FIG. 7. With this angular movement of the lever 3b, an arcuate presser portion 3c of the eccentric cam 3 is brought into engagement with the bar 32b of the movable leg 32 and then forces the bar 32b toward the bar 32a to frictionally grip the movable leg 31 by and between the bars 32a and 32b of the fixed leg 32. In this instance, the eccentric cam 3 which is made from a semi-rigid plastic is able to lock the movable leg 31 relative to the fixed leg 31 without damaging the bar 32b of the fixed leg 32. With the use of semi-rigid plastic eccentric cam 3, it is possible to set a large eccentricity of the eccentric cam 3 (that is, the distance between the center of the circular cam body and the center of the support pin 2e) which will enhance a clamping force exerted from the leg lock unit 1 on the movable and fixed legs 31, 32 of the leg 10.

When the tripod S is to be locked for transportation or storage, the levers 3b of the respective eccentric cams 3 are turned in the direction opposite to the direction of the arrow I (FIG. 7), thereby releasing the leg lock units 1 from the associated legs 10. The legs 10 are contracted and then they are closed together. Subsequently, the levers 3b are turned in the direction of the arrow I to lock the fix legs 32 and the movable legs 31. During that time, the hook 3d of each leg lock unit 1 is brought into interlocking engagement with the engagement portion 2c of an adjacent one of the leg lock units 1. Thus, the tripod S is locked against spreading in the same manner as done in the first-mentioned embodiment shown in FIG. 4.

According to the embodiment shown in FIGS. 6 and 7, the leg lock unit 1 is not secured to either of the fixed leg 32 and the movable leg 31 but freely movable between the stoppers (flanges) 33 and the stopper (flange) 44. It is, therefore, possible to lock the tripod S, with each of the leg lock units 3 disposed at any desired position within a range defined between the stoppers (flanges) 33 and the stopper (flange) 44.

The eccentric cam 3 may further include a presser projection 3f as indicated by the phantom line shown in FIG. 7. The presser projection 3f is preferably made of an elastic material and attached to the arcuate presser portion 3c of the eccentric cam 3. The elastic presser projection 3f has a function same as that of the locking piece 4 shown in FIGS. 3 and 4. The embodiment shown in FIGS. 6 and 7 may be changed in such a manner that the movable leg 31 is made of a pair of parallel spaced leg members while the fixed leg 32 is slidably disposed between the leg members of the movable leg.

Figure 8:
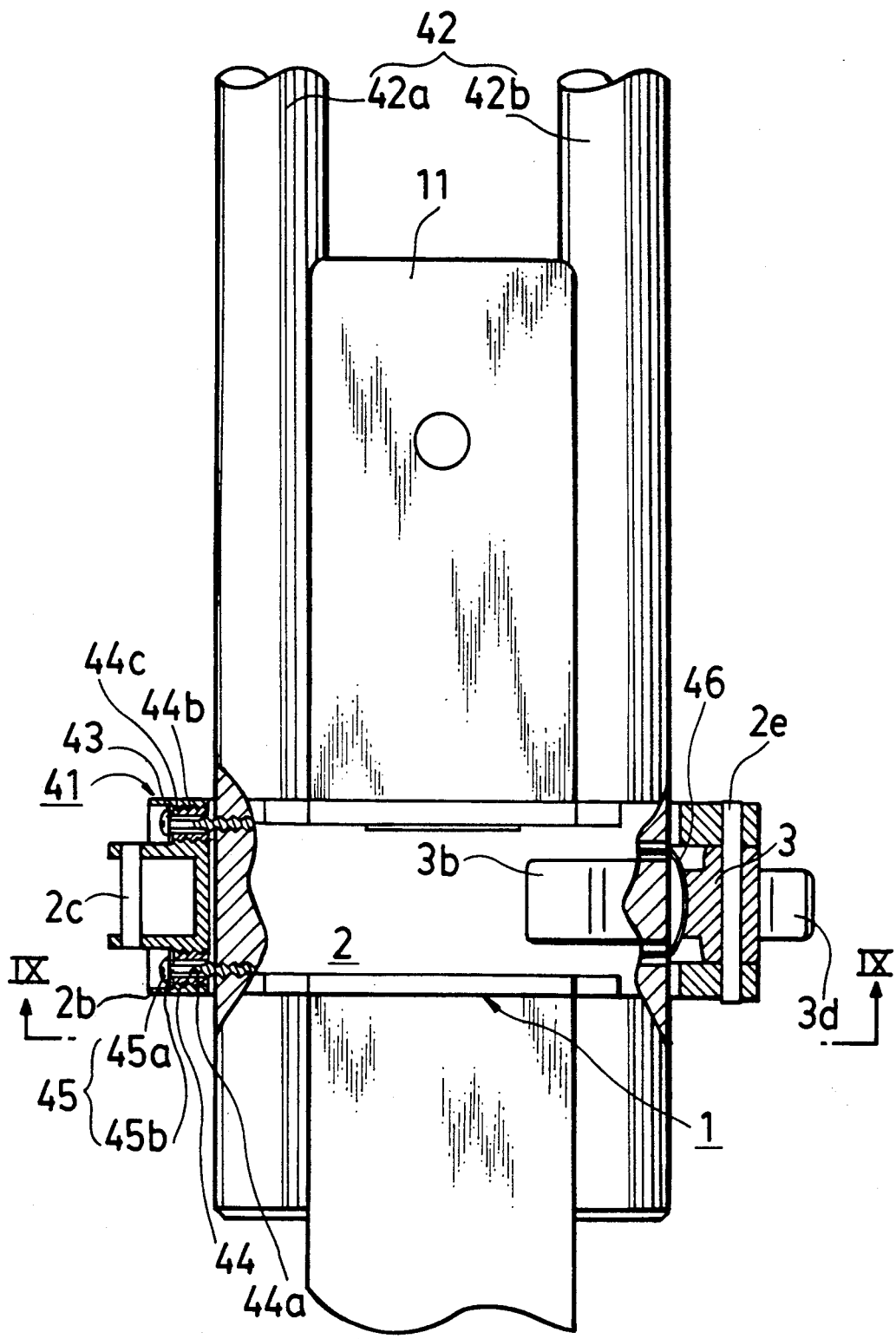
FIG. 8 is a front elevational view, with parts in cross section, of a leg rock unit according to a still further embodiment of the present invention.
Figure 9:
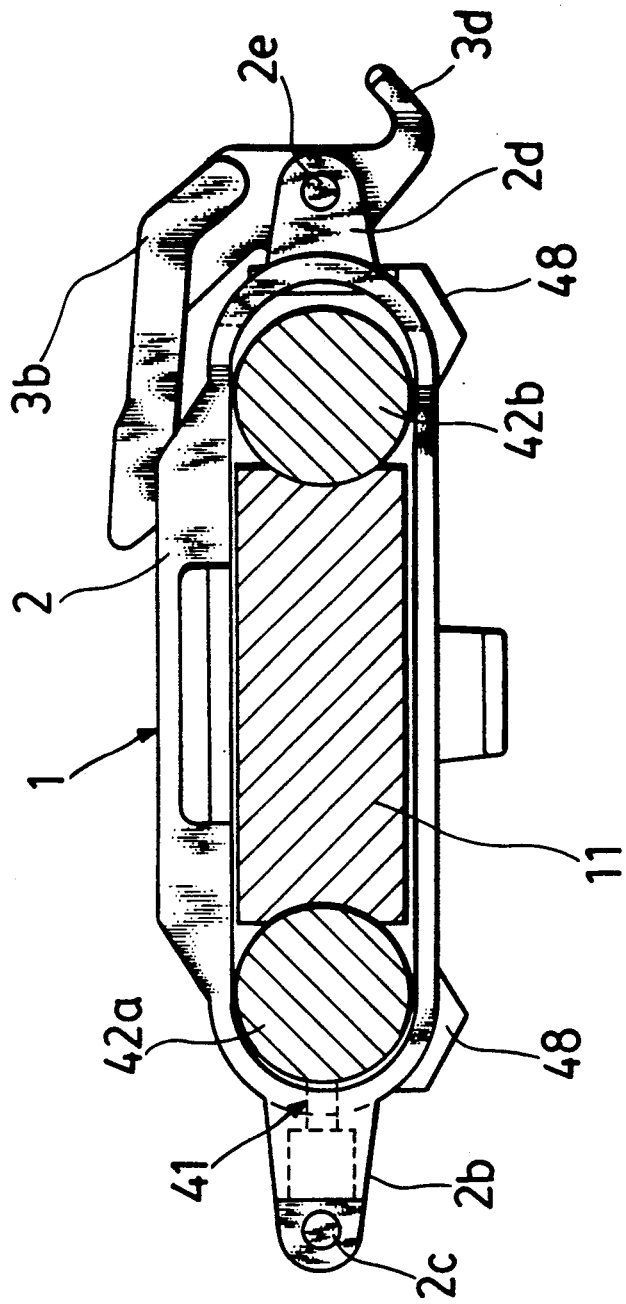
FIG. 9 is a cross-sectional view taken along line C—C of FIG. 8.
Figure 10:
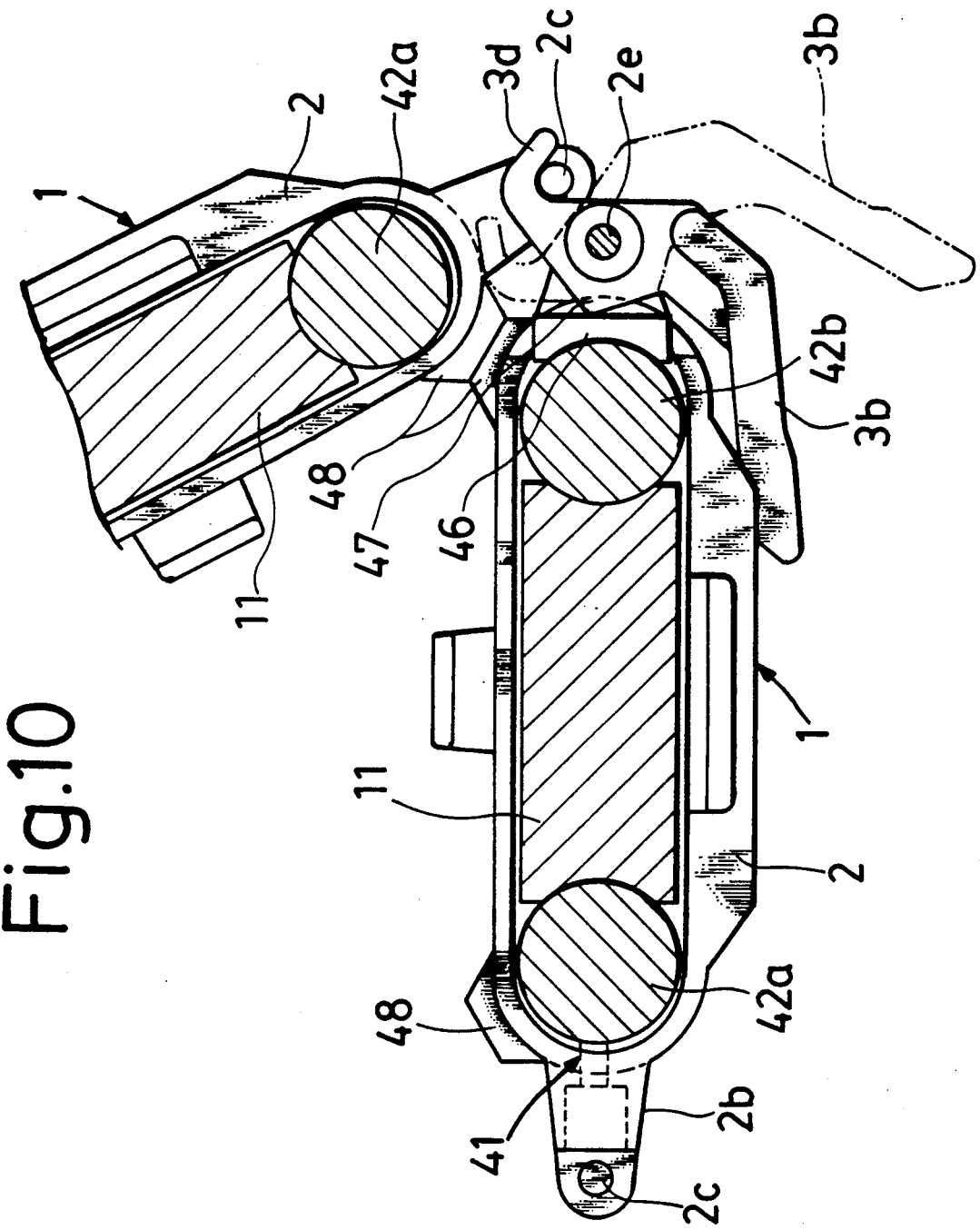
FIG. 10 is a cross-sectional view illustrative of the operation of the leg lock unit.

FIGS. 8 through 10 show a still further embodiment of the present invention. In this embodiment, each leg of the tripod includes a fixed leg 42 composed of a pair of parallel spaced round bars 42a and 42b made of wood. One of the round bars 42a is secured by two wood screws 45 to a frame 2 of each of three identical leg lock units 1 constituting a tripod lock device. Since the round bar 42a is made of wood, it may occur that a gap is produced between the frame 2 and the round bar 42a due to an abrasive wear caused during a long-term use of the tripod. The gap when produced will permit free movement or play between the round bar 42a and the frame 2 with the result that the joint between the fixed leg 42 and the leg lock unit 1 becomes loose. In order to provide a firm connection between the frame 2 and the round bar 42a, the leg lock unit 1 includes a play take-up mechanism 41 which is constructed to take up the play between the frame 2 of the leg lock unit 1 and the round bar 42a of the fixed leg 42.

The play take-up mechanism 41 comprises an adjustment screw 44 threaded into a threaded hole 44c formed in each of two parallel spaced first wings 2b of the frame 2. The threaded hole 44c extends in the first wing 2b in a direction perpendicular to a longitudinal axis of the round bar 42a and has an open end facing to an outer surface of the round bar 42a. The adjustment screw 44 is in the form of a hollow cylinder having a central through-hole 44a and an external thread 44b formed on an outer peripheral surface of the hollow cylindrical adjustment screw 44. The external thread 44b of the adjustment screw 44 is engaged with an internal thread of the threaded hole 44c. The through-hole 44a has a diameter which is larger than a maximum outside diameter of a shank 45b of a wood screw 45 and smaller than the diameter of a head 45a of the wood screw 45. The adjustment screw 44 has a slot 43 extending in and diametrically across an end face of the adjustment screw 44 for receiving a tip of a tool such as a screw driver (not shown) when the adjustment screw 44 is manually displaced in an axial direction thereof for taking up the play between the frame 2 and the round bar 42a, as described later on. The wood screw 45 has a construction known per se. The wood screw 45 passes through the central through hole 44a of the adjustment screw 44 from the slotted end face side and then threaded into the round bar 42a so as to join the frame 2 and the round bar 42a.

As shown in FIG. 8, a locking piece comprising a generally cup-shaped plate spring 46 firmly attached to the round bar 42b. More specifically, the cup-shaped plate spring 46 includes a tubular side wall and a resilient dome like bottom wall closing one end of the tubular side wall. The tubular side wall is embedded in the round bar 42b to lock the plate spring 46 in position against detachment from the round bar 42b which would otherwise occur due to vibration or shock produced during the use of the tripod. The resilient dome-like bottom wall projects radially outwardly from the peripheral surface of the round bar 32b for engagement with an eccentric cam 3. The plate spring 46 thus attached tends to drive into the round bar 42b as the number of action of the eccentric cam 3 increases. In order to prevent this tendency, a suitable spacer (not shown) is provided between the front end of the tubular side wall of the plate spring 46 and the round bar 42b. As shown in FIG. 10, the eccentric cam 3 includes a substantially triangular presser portion 47. The triangular presser portion 47 is constructed such that when the eccentric cam 3 is turned clockwise about a pin 2e until its lever 3b abuts on the frame 2, the triangular presser portion 47 is displaced from the center of the dome-like bottom wall of the plate spring 46 to the side opposite to the lever 3b side. With this arrangement, when the lever 3b is brought into contact with the frame 2 as indicated by the solid lines shown in FIG. 10, the triangular presser portion 47 deforms the dome-like bottom wall of the plate spring 46 into a substantially flat condition against the resiliency of the dome-like bottom wall. Thus, the round bar 42b is forced toward the round bar 42a so as to ensure that the movable leg 11 is firmly gripped by and between the round bars 42a and 42b of the fixed leg 42. In this instance, since the triangular presser portion 47 is displaced from the center of the plate spring 46 in the direction opposite to the lever 3b, the eccentric cam 3 including the lever 3b is locked in position against counterclockwise rotation. Due to the resiliency of the dome-like bottom wall of the plate spring 46, the eccentric cam 3 is clicked into this locking position. The leg lock unit 1 includes two abutment portions 48 disposed on opposite ends of the frame 2 for abutment with the abutment portions 48 of the adjacent leg lock units 1 when three legs of the tripod are locked together.

The operation of the play take-up mechanism 41 will be described below. When the fixed leg 42 and the movable leg 11 of each leg 10 (see FIG. 1) are assembled together by one of the leg lock units 1, the adjustment screw 44 is threaded into the threaded hole 44c formed in each of the first wings 2b of the frame 2.

Then, the wood screw 45 is forced through the central through-hole 44a of the adjustment screw 44 and then threaded into the round bar 42a of the fixed leg 42. Thus, the frame 2 and the round bar 42a are firmly connected together. When the frame 2 and the round bar 42a tend to play with reach other due to a gap produced therebetween during a long period of use of the tripod, the adjustment screws 44 are turned in one direction until they abut against the peripheral surface of the round bar 42a. In this instance, the heads 45a of the wood screws 45 are spaced from the respective slotted end faces of the adjustment screws 44 by a distance equal to the gap between the frame 2 and the round bar 42a. Then, the wood screws 45 are threaded further into the round bar 42a until the respective heads 45a engage the corresponding slotted end faces of the adjustment screws 44. Thus, the frame 2 and the round bar 42a are tightly fastened together without play. Since the play between each leg lock unit 1 and the fixed leg 42 of a corresponding one of the legs is thus taken up by the play take-up mechanism 41, the tripod can be used reliably for a long period of time.

Obviously, various minor changes and modifications of the present invention are possible in the light of the above teaching. It is therefore to be understood that within the scope of the appended claims the invention may be practiced otherwise than as specifically described.

What is claimed is:

1. A tripod lock device for locking a tripod having a head and three identical legs each connected by one hinge to the head, each of the three legs being composed of a fixed leg and a movable leg slidably movable relative to the fixed leg, one of the fixed leg and the movable leg including a pair of parallel spaced leg members, the other of the fixed leg and the movable leg being slidably disposed between the leg members for expanding and contracting each respective leg, said tripod lock device comprising:

three identical leg lock units each associated with one of the three legs of the tripod for locking the movable leg and the fixed leg against relative movement, said leg lock units being engageable with each other to lock the three legs of the tripod against spreading, each of said leg lock units including a frame, an eccentric cam and an engagement portion;

said frame having a through-hole in which said leg members of one of said fixed leg and the movable leg and the other of the fixed leg and the movable leg are disposed, one of said leg members being secured to said frame;

said eccentric cam being rotatably mounted on said frame at a position adjacent to the other of said leg members, said eccentric cam having a presser portion and a hook, when said eccentric cam is rotated in one direction, said presser portion of said eccentric cam forcing said other leg member toward said one leg member to firmly grip the other of said fixed leg and said movable leg between said one leg member and said other leg member; and said engagement portion being disposed on said frame at a position adjacent to said one leg member in a diagrammatically opposite relation to said eccentric cam about said through-hole, said engagement portion of each of the three leg lock units being interlockingly engageable with said hook of an adjacent one of the three leg lock units to lock the three legs of the tripod when said eccentric cam is rotated in said one direction with the three legs of the tripod disposed near together.

2. A tripod lock device according to claim 1, wherein said one of said fixed leg and said movable leg has a sliding surface complementary in contour to the shape of a sliding surface of said other of said fixed leg and said movable leg.

3. A tripod lock device according to claim 1, wherein said eccentric cam is made from a synthetic resin.

4. A tripod lock device according to claim 1, wherein said eccentric cam is made from a semi-rigid plastic.

5. A tripod lock device according to claim 1, wherein said eccentric cam further includes a presser projection disposed on said presser portion, said presser projection being made of an elastic material.

6. A tripod lock device according to claim 1, wherein said frame includes a body in which said through-hole is formed, and a pair of parallel spaced wings projecting from a portion of said body adjacent to said one leg member, said engagement portion comprising a rod extending between said wings.

7. A tripod lock device according to claim 1, wherein said one of said fixed leg and said movable leg has a locking piece attached to said other leg member in confronting relation to said eccentric cam, said presser portion of said eccentric cam being engageable with said locking piece for forcing said other leg member toward said one leg member.

8. A tripod lock device according to claim 7, wherein said eccentric cam is made from a rigid plastic.

9. A tripod lock device according to claim 7, wherein said locking piece is made of an elastic material.

10. A tripod lock device according to claim 1, wherein said eccentric cam includes a flat circular plate-like cam body having a predetermined thickness, a hole formed in said cam body at a position which is displaced from the center of said cam body in a direction opposite to said presser portion, a lever projecting from a first outer peripheral portion of said cam body, and a hook projecting from a second outer peripheral portion of said cam body diametrically opposite to said first outer peripheral portion, said hook having a front end portion bent in a direction same as said one direction, said cam body being rotatable about a center of said hole.

11. A tripod lock device according to claim 10, wherein said hook of each of said three leg lock units has a projection engageable in a clicking manner with said engagement portion of an adjacent one of said three leg lock units.

12. A tripod lock device according to claim 1, wherein each of said leg lock unit further includes a play take-up mechanism associated with said frame for taking up a play between said one leg member and said frame.

13. A tripod lock device according to claim 12, wherein said one leg member and said frame are connected together by a screw fastener, said frame has a threaded through-hole having one end facing to said one leg member, and said play take-up mechanism includes an adjustment screw threaded into said threaded through-hole and having a central through-hole, said screw fastener passing through said central through-hole and threaded into said one leg member.

14. A tripod which comprises a head and three identical legs each connected by one hinge to said head, each of said three legs being composed of a fixed leg and a movable leg slidably movable relative to said fixed leg, one of said fixed leg and said movable leg including a pair of parallel spaced leg members, the other of said fixed leg and said movable leg being slidably disposed between the leg members for expanding and contracting each respective leg, wherein said tripod further includes a tripod lock device for locking said tripod, said tripod lock device being composed of three identical leg lock units each mounted on one of said three legs of said tripod for locking said movable leg and said fixed leg against relative movement, said leg lock units being engageable with each other to lock said three legs of said tripod against spreading, wherein each of said leg lock units is movable within a limited range in a longitudinal direction of a corresponding one of said three legs, and each of said three legs has a first stopper disposed at an end of said fixed leg and a second stopper disposed at an end of said movable leg, said first and second stoppers defining opposite ends of said limited range within which said leg lock unit is movable, wherein each of said leg lock units includes a frame, an eccentric cam and an engagement portion, wherein said frame has a through-hole in which said leg members of said one of said fixed leg and said movable leg and said other of said fixed leg and said movable leg are disposed, wherein said eccentric cam is rotatably mounted on said frame at a position adjacent to one of said leg members, said eccentric cam having a presser portion and a hook, when said eccentric cam is rotated in one direction, said presser portion of said eccentric cam forcing said one leg member toward the other of said leg members to firmly grip said other of said fixed leg and said movable leg between said one leg member and said other leg member, and wherein said engagement portion is disposed on said frame at a position adjacent to said other leg member in a diagrammatically opposite relation to said eccentric cam about said through-hole, said engagement portion of each of said three leg lock units being interlockingly engageable with said hook of an adjacent one of said three leg lock units to lock said three legs of said tripod when said eccentric cam is manually rotated in said one direction with the three legs of the tripod disposed near together.

15. A tripod lock device according to claim 14, wherein said one of said fixed leg and said movable leg has a sliding surface complementary in contour to the shape of a sliding surface of said other of said fixed leg and said movable leg.

16. A tripod lock device according to claim 14, wherein said eccentric cam is made from a synthetic resin.

17. A tripod lock device according to claim 14, wherein said eccentric cam is formed from a semi-rigid plastic.

18. A tripod lock device according to claim 14, wherein said eccentric cam further includes a presser projection disposed on said presser portion, said presser projection being made of an elastic material.

19. A tripod lock device according to claim 14, wherein said frame includes a body in which said through-hole is formed, and a pair of parallel spaced wings projecting from a portion of said body adjacent to said other leg member, said engagement portion comprising a rod extending between said wings.

20. A tripod lock device according to claim 14, wherein said one of said fixed leg and said movable leg has a locking piece attached to said one leg member in confronting relation to said eccentric cam, said presser portion of said eccentric cam being engageable with said locking piece for forcing said one leg member toward said other leg member.

21. A tripod lock device according to claim 20, wherein said eccentric cam is made from a rigid plastic.

22. A tripod lock device according to claim 20, wherein said locking piece is made of an elastic material.

23. A tripod lock device according to claim 14, wherein said eccentric cam includes a flat circular plate-like cam body having a predetermined thickness, a hole formed in said cam body at a position which is displaced from the center of said cam body in a direction opposite to said presser portion, a lever projecting from a first outer peripheral portion of said cam body, and a hook projecting from a second outer peripheral portion of said cam body diametrically opposite to said first outer peripheral portion, said hook having a front end portion bent in a direction same as said one direction, said cam body being rotatable about a center of said hole.

24. A tripod lock device according to claim 23, wherein said hook of each of said three leg lock units has a projection engageable in a clicking manner with said engagement portion of an adjacent one of said three leg lock units.

* * * * *